United States Patent [19]
Palmer et al.

[11] Patent Number: 6,002,798
[45] Date of Patent: Dec. 14, 1999

[54] METHOD AND APPARATUS FOR CREATING, INDEXING AND VIEWING ABSTRACTED DOCUMENTS

[75] Inventors: Douglas L. Palmer, Foothill Ranch; Toshiaki Yagasaki, Irvine, both of Calif.

[73] Assignee: Canon Kabushiki Kaisha, Tokyo, Japan

[21] Appl. No.: 08/005,444

[22] Filed: Jan. 19, 1993

[51] Int. Cl.⁶ ........................................ G06K 9/00
[52] U.S. Cl. ............................................. 382/176
[58] Field of Search ....................... 395/800, 147, 395/162, 100, 144, 145, 118, 603, 615, 800.01; 382/61, 10, 58, 159, 176, 180, 181; 707/3, 104; 712/1

[56] References Cited

U.S. PATENT DOCUMENTS

| | | | |
|---|---|---|---|
| 4,408,181 | 10/1983 | Nakayama | 82/61 |
| 4,455,619 | 6/1984 | Masui et al. | 364/900 |
| 4,503,556 | 3/1985 | Scherl et al. | 382/9 |
| 4,513,442 | 4/1985 | Scherl | 382/49 |
| 4,591,904 | 5/1986 | Urabe et al. | 358/75 |
| 4,712,191 | 12/1987 | Penna | 364/900 |
| 4,737,912 | 4/1988 | Ichikawa | 364/413 |
| 4,758,980 | 7/1988 | Tsunekawa et al. | 364/900 |
| 4,760,606 | 7/1988 | Lesnick et al. | 382/48 |
| 4,764,867 | 8/1988 | Hess | 364/200 |
| 4,797,946 | 1/1989 | Katsuta et al. | 362/61 |
| 4,803,643 | 2/1989 | Hickey | 364/523 |
| 4,808,987 | 2/1989 | Takeda et al. | 340/721 |
| 4,823,303 | 4/1989 | Terasawa | 364/521 |
| 4,907,285 | 3/1990 | Nakano et al. | 382/176 |
| 4,933,880 | 6/1990 | Borgendale et al. | 364/523 |
| 4,949,392 | 8/1990 | Barski et al. | 382/61 |
| 5,018,083 | 5/1991 | Watanabe et al. | 364/523 |

(List continued on next page.)

FOREIGN PATENT DOCUMENTS 465818  1/1992  European Pat. Off. ........ G06F 15/40

OTHER PUBLICATIONS

Nagy et al., "A Prototype Document Image Analysis System for Technical Journals", Computer, Jul. 1992, p;10–22.

PTOS, Journal of the Patent Office Society, Oct. 1983, p;536–586.

G. Nagy, et al., "A Prototype Document Image Analysis System For Technical Journals", Computer, vol. 25, No. 7, Jul. 1992, pp. 10–22.

S. Al–HAwamdeh, et al., "Compound Document Processing System", Proceedings Compsac '91—The 15th Annual International Computer Software & Applications Conference, Sep. 1991, pp. 640–644.

*Primary Examiner*—John A. Follansbee
*Attorney, Agent, or Firm*—Fitzpatrick, Cella, Harper & Scinto

[57] ABSTRACT

Method and apparatus for storing document images, for creating retrieval index by which the document images may be retrieved, and for displaying the retrieved document images. When a document image is obtained, the document image is subjected to rule-based block selection techniques whereby individual regions within the document region are identified, and the types of regions are also identified, such as title-type regions, text-type regions, line art-type regions, halftone-type regions and color image-type regions. The identification is used to create structural information and both the document image and the structural information is stored. A word-based retrieval index is created based on title-type regions and/or text-type regions, the retrieval index being used in conjunction with a search query so as to be able to retrieve documents which match the search query. The retrieved documents are displayed in either a full image mode or a rapid browsing mode. In the rapid browsing mode, the full image of the document is not displayed, but rather only an abstract structural view of the document image based on the stored structural information. The level of abstraction may be specified by the operator in connection with the identified structural regions of the document, whereby, for example, only a structural view is displayed, or only title-type regions are displayed mixed with remaining structure.

118 Claims, 10 Drawing Sheets

U.S. PATENT DOCUMENTS

| | | | |
|---|---|---|---|
| 5,021,976 | 6/1991 | Wexelblat et al. | 364/521 |
| 5,038,381 | 8/1991 | Nelson | 382/9 |
| 5,048,099 | 9/1991 | Lee | 382/22 |
| 5,050,222 | 9/1991 | Lee | 382/21 |
| 5,073,953 | 12/1991 | Westdijk | 382/9 |
| 5,093,873 | 3/1992 | Takahashi | 382/61 |
| 5,109,439 | 4/1992 | Froessl | 382/61 |
| 5,113,492 | 5/1992 | Ariki et al. | 395/147 |
| 5,144,679 | 9/1992 | Kakumoto | 382/1 |
| 5,150,434 | 9/1992 | Hori et al. | 382/57 |
| 5,235,653 | 8/1993 | Nakano et al. | 382/175 |
| 5,237,628 | 8/1993 | Levitan | 382/61 |
| 5,265,242 | 11/1993 | Fujisaw et al. | 707/3 |
| 5,278,918 | 1/1994 | Bernzott et al. | 382/176 |
| 5,319,745 | 6/1994 | Vinsonneau et al. | 395/144 |
| 5,339,409 | 8/1994 | Sakuragi | 395/603 |
| 5,349,648 | 9/1994 | Handley | 395/148 |
| 5,359,673 | 10/1994 | de La Beaujardiere | 382/229 |
| 5,367,672 | 11/1994 | Takagi | 395/603 |
| 5,369,716 | 11/1994 | Sangu | 382/317 |
| 5,396,588 | 3/1995 | Froessl | 395/145 |
| 5,553,277 | 9/1996 | Hirano et al. | 395/615 |
| 5,628,003 | 5/1997 | Fujisawa et al. | 395/615 |
| 5,680,479 | 10/1997 | Wang et al. | 382/176 |

Canon

41

Canon Information Systems, Inc.
Technical Information Center Newsletter
Published by Joyce Peluso
April 27, 1992, Volume 2, No. 4-4

42 Canon Wants Mutually Rewarding Coexistence

40

Source: Fortune, 7/29/91

Ryuzaburo Kaku, Chairman of the Board of Canon, Inc. in his recent interview had the following to say about the corporate world. The world is divided into four types of companies:
(1) Purely capitalistic enterprises that exploit their workers for profit.
43
(2) Those where management and labor work closely together to maximize profits, but don't pay enough attention to the community
(3) A company that both tries to make money but also seeks to fulfill its corporate responsibilities to society, but in a small scale way to a particular country or region.
(4) A highly evolved type of company that contributes positively to world prosperity.

Canon is aspiring to be the fourth type of company. This is a company that is socially responsible and
44 practices good corporate citizenship at home and overseas and that can be referred to as a true global corporation. We have a basic philosophy to achieve a mutually rewarding coexistence among employees, shareholders, customers and the communities in which we do business.

45

Color Ink Jet Printer Sales
Source: BIS Strategic Decisions
(thousands of units)

[graph showing values from about 50 in '90 rising to about 500 in '95]

Canon Develops World's First Ferroelectric Liquid Crystal Display

Source: Wall Street Journal, 10/2/91,
Canon Press Release, 10/1/91

In a news conference yesterday, Hiroshi Tanaka, a Canon senior managing director said that the company has succeeded in developing the world's first ferroelectric liquid crystal (FLC) display screen. The screen will be test marketed next spring in Canon's EZPS Japanese language DTP system.

46

Canon's Corporate Culture to Blend Best of U.S. & Japan 47

Source: Fortune, 8/26/91

Mr. Hideharu Takemoto, President of Canon U.S.A. was recently interviewed by Fortune Magazine and had the following to say about Canon in North America. 48

Mr. Takemoto wants to create a new Canon corporate culture, "The best of American and Japanese cultures must be blended to produce a richer corporate alchemy--a new ideal."

Canon wants to create more jobs for Americans in the 1990s and to make them an integral part of the Canon family. Mr. Takemoto is further committed to cultivating local talent and moving local executives up through the ranks of Canon's highest corporate echelons.

Ink-Jet Printer Market Share 50
Source: Computer Reseller News/Info Corp

| Selected Ink-Jet printers | March | April | May | June |
|---|---|---|---|---|
| Apple Stylewriter | 17.5% | 26.7% | 41.5% | 31.5% |
| H-P | | | | |
| PaintJet | <1% | 2% | <1% | <1% |
| DeskJet 500 | 49% | 39% | 31.6% | 24.6% |
| DeskWriter | 31% | 27.3% | 20.4% | 14.9% |
| Canon | | | | |
| BJ10E | <1% | 3.4% | 4.3% | 7.9% |
| BJ300/330 | <1% | <1% | <1% | <1% |

| DOCUMENT IDENTIFIER | | | | | | | |
|---|---|---|---|---|---|---|---|
| DOCUMENT TYPE | | | | | | | |
| REGION IDENTIFIER | REGION TYPE | ULC | LRC | RELATED REGIONS | REGION ATTRIBUTES | | |
| 1 | TITLE | <0, 0> | <5, 40> | --- | | | |
| 2 | TITLE | <6, 5> | <10, 45> | 3 | ROMAN 15 PT | | |
| 3 | TEXT | <12, 0> | <35, 50> | 2 | ROMAN 8 PT | | |
| 4 | TEXT | <36, 0> | <45, 50> | --- | ROMAN 8 PT | | |
| 5 | LINE ART | <46, 0> | <60, 50> | --- | | | |
| 6 | HALF-TONE | <6, 55> | <40, 100> | --- | | | |
| 7 | TITLE | <42, 60> | <50, 100> | 8 | ROMAN 15 PT | | |
| 8 | TEXT | <52, 55> | <55, 100> | 7 | ROMAN 8 PT | | |
| ... | ... | ... | ... | ... | ... | | |

FIG. 6

METHOD AND APPARATUS FOR CREATING, INDEXING AND VIEWING ABSTRACTED DOCUMENTS

BACKGROUND OF THE INVENTION

1. Field of the Invention

The present invention relates to a method and apparatus for creating a collection of indexed document images whereby the document images may be retrieved through the index, and to a method and apparatus for rapidly browsing through document images by viewing abstract structural views of the document images rather than the document images themselves.

2. Description of the Related Art

Recently, as increasingly larger storage devices have become available, and it has become possible to store documents not simply as ASCII text but also as a full facsimile image of the document. More specifically, it is now commonplace to convert a document into a computer-readable bit map image of the document and to store the bit map image of the document. Accordingly, whereas ASCII text storage permitted storage and display of only text portions of documents, it is now possible to store a document in computer readable form and to display not only the text but also pictures, line art, graphs, tables and other non-text objects in the document. Likewise, it is also possible to store and display documents such that text attributes, such as size, font, position, etc., are preserved.

Despite these advances, however, it is still difficult to retrieve the document images into computer memory quickly, and then to browse quickly through computer-displayed document images, for example, in a situation where a computer operator retrieves many document images and searches through those document images to find a particular document. These difficulties can be attributed to at least two limitations. First, current limitations on bandwidth of the computer systems limit of the speed at which documents may be retrieved from storage and displayed. For example, at 300 dots-per-inch resolution, an ordinary 8½ by 11 inch black and white document requires approximately 8.4 million bits to store a full document image. Adding halftone (grey levels) or color to the image, or increasing the resolution at which the image is stored, can easily increase storage requirements to many tens of millions of bits. The time required to retrieve those bits from storage and to create and display the resulting image is significant, even with current high speed computing equipment. The time is lengthened even further in situations where the document image is retrieved from storage in a first computer and electronically transmitted, for example, by modem, to a second computer for display on the second computer.

Second, even when a full document image is displayed to an operator, there is ordinarily too much information for an average operator to comprehend quickly. Much of the information displayed to the operator is not relevant to the operator's query and much time is therefore wasted in displaying the non-relevant information. And the presence of such non-relevant information can slow the operator in his attempt to locate and understand document information that is relevant to the query.

Moreover, simply retrieving appropriate documents for presentation to an operator from a large collection of documents can prove difficult because of the large amount of information that must be searched. Conventional document retrieval systems ordinarily rely on the creation of a text index by which text documents may be retrieved. With document images (as opposed to text documents), it has been proposed to subject the document images to optical character recognition processing ("OCR processing") and to index the resulting text. Systems such as those proposed in U.S. Pat. No. 5,109,439 to Froessl suggest that is only necessary to OCR-process specific areas of the document to simplify the indexing process, but it has nevertheless heretofore proved difficult to create an adequate index for retrieval of document images.

SUMMARY OF THE INVENTION

It is an object of the present invention to address the foregoing difficulties.

In one aspect, the invention provides a system for rapidly browsing through document images by displaying not the full document image, but rather only an abstract structural view of the document image. More specifically, a structural view of a document image includes labelled objects such as "title", "text", "table", "line art", "half-tone" and similar objects that are ordinarily found in documents, and those objects are displayed for presentation to the operator in an abstract structured layout that is representative of the full document image. The level of abstraction and how the document is rendered on the display may be defined by the operator. Thus, it is possible for the operator to specify a high level of abstraction where only labelled objects are displayed in the appropriate layout; likewise, it is also possible for the operator to specify a lower level of abstraction where the original document image for only specific types of objects, such as for titles, is displayed. It is also possible for the operator to specify that text type objects should be displayed as ASCII equivalent characters rather than the original image of the text. By displaying only abstract structural views of document images rather than the full document image, and by permitting the operating to specify the level of abstraction, it is possible to retrieve and display document images quickly and to present the information to the operator in a quickly comprehendible format.

According to this aspect, the invention provides a method and apparatus for storing document images in which a document image is obtained, for example, by scanning an original document, the document image is processed to determine the structure of the document, and the structure of the document is stored together with the document image. Preferably, the structure of the document is determined by conventional block selection techniques which utilize a rule-based knowledge system for identifying specific areas in a document and for determining the content of the image within those areas such that the document image is decomposed into a general set of objects. Suitable block selection techniques are described in application Ser. No. 07/873,012 filed Apr. 24, 1992, now U.S. Pat. No. 5,680, 479 entitled "Method and Apparatus for Character Recognition".

According to this aspect, the invention further provides a method for displaying document images in which, given an image of a document and its corresponding structure, a representation of the structure of the document is displayed and selected structural areas of the display are selectively replaced with corresponding areas from the full document image. The abstraction level at which the structure is displayed may be designated, whereby the structural representation may be displayed with mixed areas of structure and full document image (or ASCII text equivalent) in accordance with the designated abstraction level. If desired, the display may be either a visual display or a verbal display in which the structure and content of the document is enunciated through text-to-speech techniques which convert the structural and contextual information into spoken words for aural communication.

In a further aspect of the invention, a retrieval index by which images of documents may be retrieved is created. According to this aspect a document is scanned to form a document image, and the document image is processed, for example, by block selection techniques, to identify areas on the document of a first type such as title areas, and areas on the document of other types. The document image in the first type areas are converted into text, for example, by optical character recognition ("OCR") techniques. The converted text is indexed so as to form a retrieval index, and the document image is stored together with the indexed text such that the stored document index may be retrieved with reference to the indexed text. Advantageously, the invention creates a retrieval index only from first-type areas of the document, such as from title areas of the document or from the first paragraph of text areas of the document.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 5 is a view showing a representative input document.

FIG. 6 is a view for explaining how various blocks identified within original documents are stored.

FIGS. 8 to 10 are views showing representative displays of an abstracted document, in which FIGS. 9 and 10 are views showing expansion of selected areas of the abstracted document.

DETAILED DESCRIPTION OF THE PREFERRED EMBODIMENT

Figure 1:
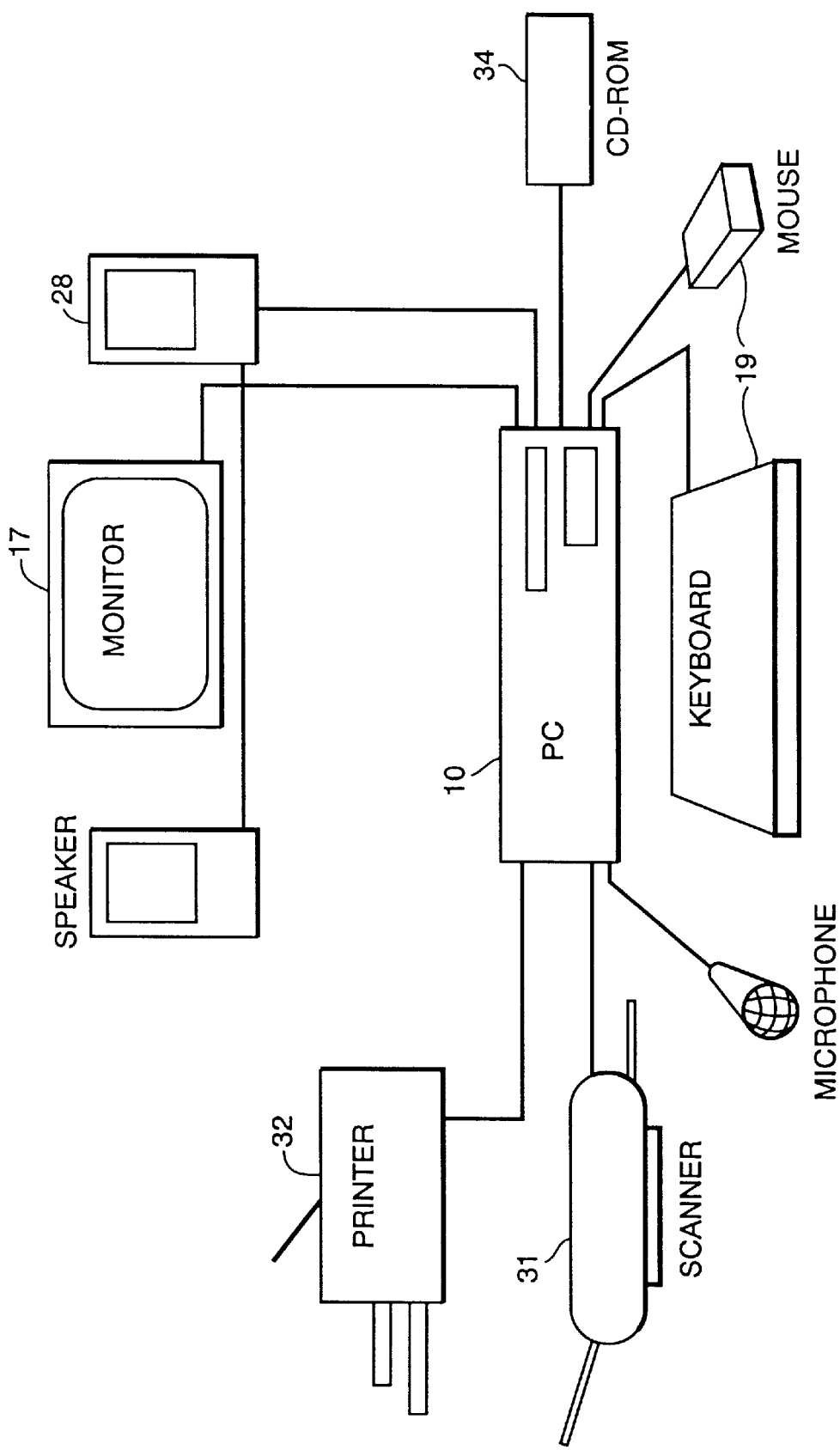
FIG. 1 is a perspective view of the outward appearance of an apparatus according to the invention.
Figure 2:
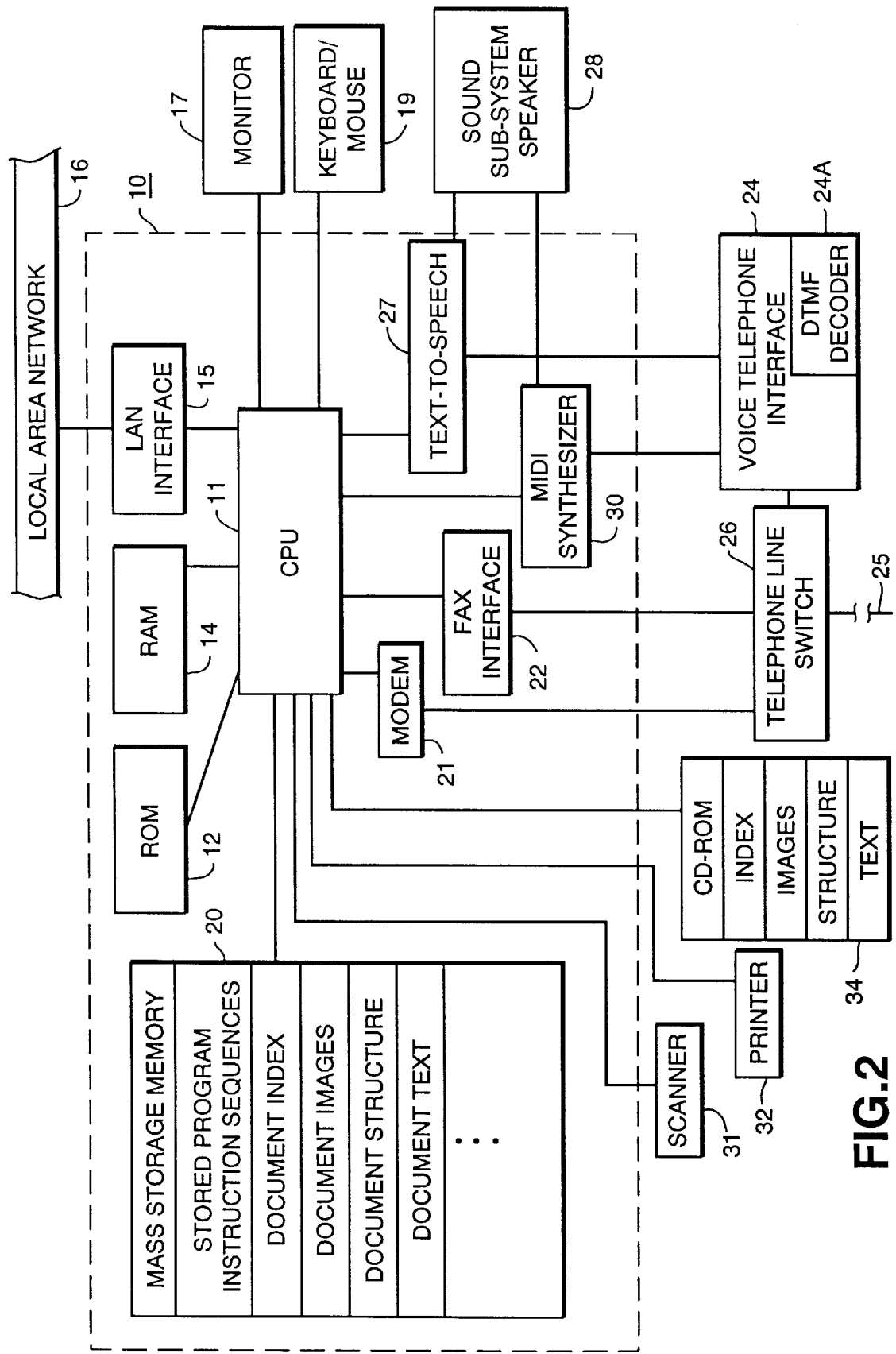
FIG. 2 is a block diagram of the FIG. 1 apparatus.

FIGS. 1 and 2 show an apparatus according to the present invention.

As shown in these figures, reference numeral 10 designates personal computing equipment such as an IBM PC or PC-compatible computer. Computing equipment includes a CPU 11 such as an 80386 processor which executes stored program instructions such as operator selected applications programs that are stored in RAM 12 or specialized functions such as start-up programs or BIOS which are stored in ROM 14. Computing equipment 10 further includes a local area network interface 15 which provides interface to a local area network 16 whereby the computing equipment 10 can access files such as document files on a remote file server or send files for remote printing or have remote machines access document images on equipment 10 or otherwise interact with a local area network in accordance with known techniques such as by file exchange or by sending or receiving electronic mail.

Computing equipment 10 further includes a monitor 17 for displaying graphic images and a keyboard/mouse 19 for allowing operator designation of areas on monitor 17 and inputting information.

Mass storage memory 20, such as a fixed disk or a floppy disk drive, is connected for access by CPU 11. Mass storage 20 typically includes stored program instruction sequences such as an instruction sequence for scanning, indexing, retrieving and displaying documents according to the invention, as well as other stored program instruction sequences for executing application programs such as word processing application programs, optical character recognition programs, block selection applications programs, spreadsheet application programs, and other information and data processing programs. Mass storage memory 20 further includes document index tables which contain index information by which documents may be retrieved as well as bit map images of documents, document structures, and ASCII text for text areas of the documents. Other data may be stored on mass storage memory 20 as desired by the operator.

A modem 21, a facsimile interface 22, and a voice telephone interface 24 are provided so that CPU can interface to an ordinary telephone line 25. Each of the modem 21, facsimile interface 22, and voice telephone interface 24 are given access to the telephone line 25 via a telephone line switch 26 which is activated under control by CPU 11 so as to connect telephone line 25 to one of the modem 21, the facsimile 22, or the voice telephone interface 24, as appropriate to the data being sent and received on the telephone line. Thus, CPU 11 can send and receive binary data such as ASCII text files or document images files via modem 21 and it can be controlled by a remote computer via modem 21, it can send and receive facsimile messages via facsimile interface 22, and it can interact on an ordinary voice telephone line via voice telephone interface 24. In this regard, voice telephone interface 24 is provided with a DTMF decoder 24A so as to decode tones on the voice telephone line 25 which correspond to operator depressions of a telephone keypad. In accordance with stored program instruction sequences in mass storage memory 20, the decoded tones are interpreted by CPU 11 into operator commands, and those operator commands are executed so as to take predesignated actions in accordance with operator depressions of the telephone keypad.

A conventional text-to-speech convertor 27 is connector to the CPU 11. The text-to-speech convertor 27 interprets text strings that are sent to it and converts those text strings to audio speech information. The text-to-speech convertor 27 provides audio speech information either to a speaker 27 for enunciation to a local computer operator, or provides audio speech information to the voice telephone interface 24 for enunciation over ordinary voice telephone lines.

MIDI ("Musical Instrument Digital Interface") synthesizer 30 is also connected to CPU 11 and interprets MIDI music commands from CPU 11 so as to convert those MIDI music commands to audio wave forms. The audio wave forms are, in turn, played out over speaker 28 or provided to voice telephone interface 24 for play out over ordinary voice telephone lines.

Scanner 31 operates to scan original documents printed on a sheet of paper, and to convert the information of those original documents into a bit-by-bit computer readable representation of that document. Scanner 31 may be a simple black and white scanner, but more preferably scanner 31 includes at least half-tone (grey scale) processing capabilities and/or color processing capabilities.

Printer 32 is provided to form images of documents under the control of CPU 11. Printer 32 may be an ordinary black and white printer, but, more preferably, printer 32 includes half-tone and/or color capabilities.

A CD ROM 34, such as an optical disk, is connected for access by CPU 11. CD ROM 34 operates to supplement the storage in mass storage memory 20 and contains additional information concerning document indexes and document images and document structure. It is also possible to provide a write-once-read-many ("WORM") optical device or an ordinary read/write optical device so as to further supplement the storage capabilities. In addition, the local area network 16, CPU 11 can access document indexes and document images and document structure stored at remote file server locations, and via modem 21, CPU 11 can access document indexes and document images stored at centralized data base locations over ordinary voice telephone lines.

Figure 3:
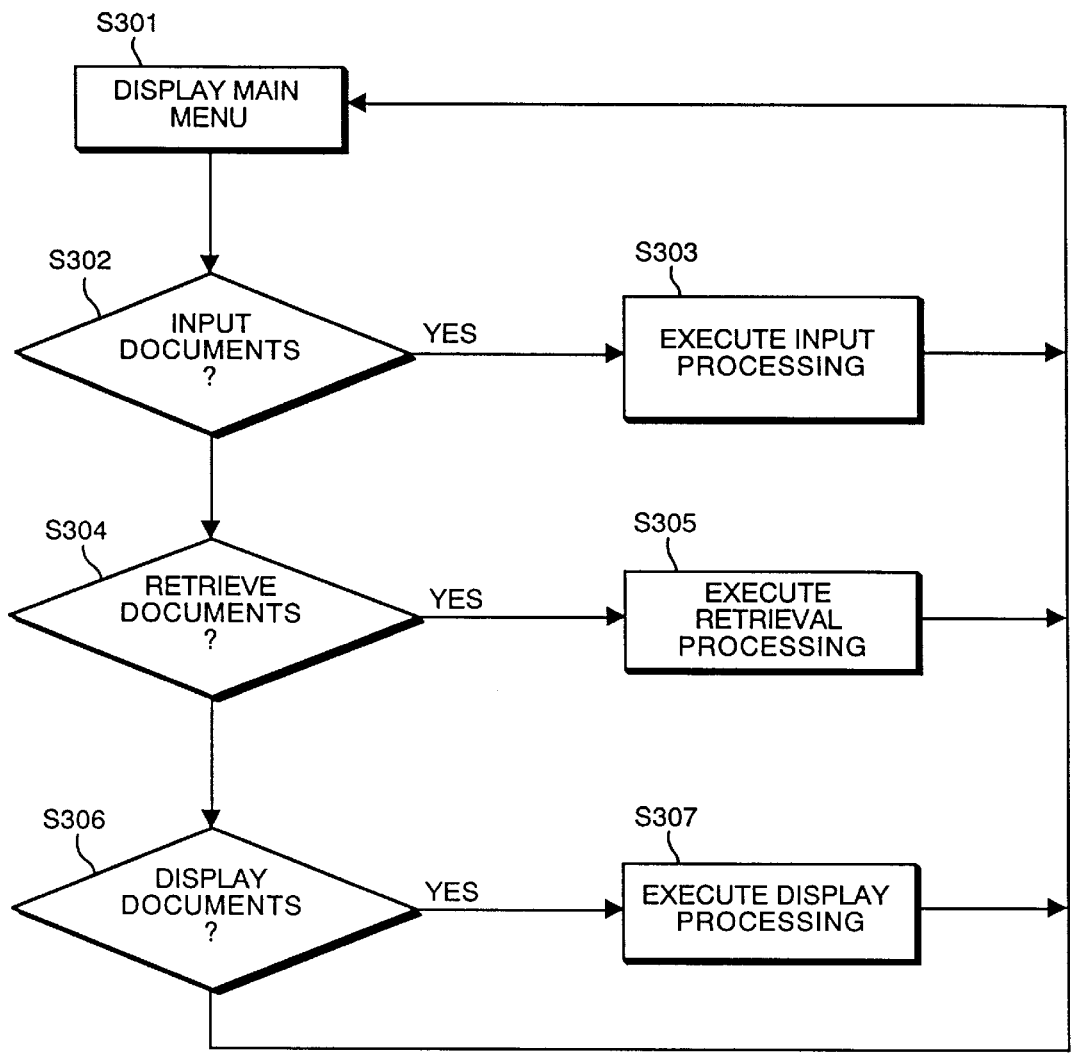
FIG. 3 is a full diagram showing the overall operation of the FIG. 1 apparatus.

FIG. 3 is a flow diagram showing overall operation of the FIGS. 1 and 2 apparatus. The process steps shown in FIG. 3 are executed by CPU 11 in accordance with stored program instruction sequences stored in mass storage 20 and executed out of RAM 14.

In step S301, CPU 11 displays a main selection menu on monitor 17 and permits operator selection of one of the menu items. In step S302, if the operator has selected to input documents, then flow advances to step S303 in which document image processing is executed, after which flow returns to step S301. If the operator does not select document input but instead selects to retrieve documents (step S304) then flow advances to step S305 in which document retrieval processing is executed, after which flow returns to step S301. If the operator does not select document retrieval but instead selects to display documents (step S306), then flow advances to step S307 in which document display processing is executed, after which flow returns to step S301. Each of these processes is discussed in greater detail below.

Although the flow processing illustrated in FIG. 3 appears to be executed serially and sequentially, it is to be understood that the processes may be executed at significantly different times, in different order, and indeed may be executed by different machines. For example, it is possible for a first machine to input documents and to store those documents for retrieval and display by a different machine. Likewise, it is possible for one machine to retrieve documents and transmit them to another machine, for example, via modem 21, for display on that other machine.

Figure 4:
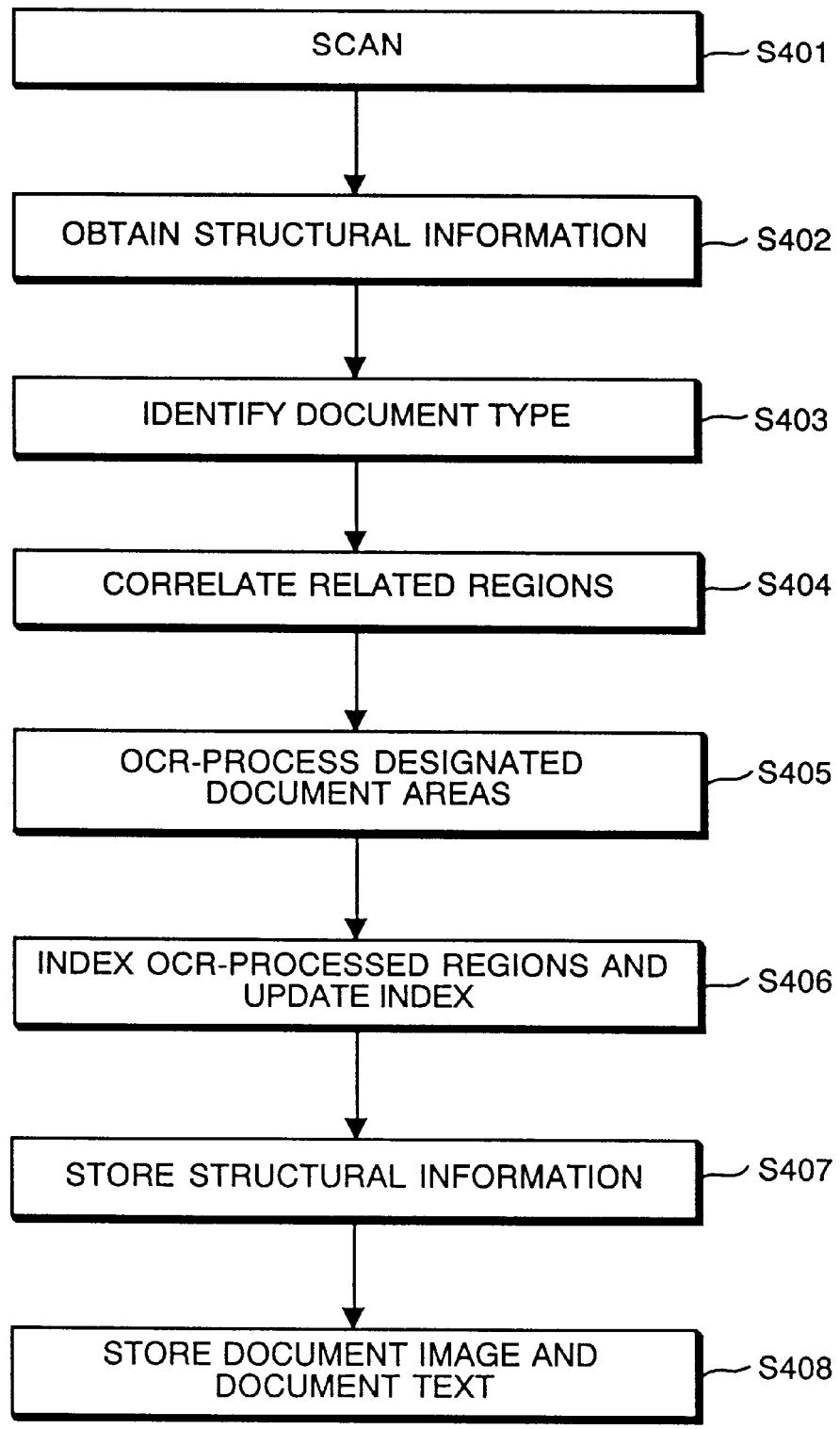
FIG. 4 is a full diagram showing inputting and indexing documents according to the invention.

FIG. 4 is a detailed flow diagram illustrating document input processing in accordance with step S303 of FIG. 3.

In step S401 CPU 11 causes scanner 31 to scan an original document fed into scanner 31 so as to convert the original document into a computer readable bit map image of that document. The bit map image may be temporarily stored in RAM 14 for further processing.

In step S402, CPU 11 derives structural information concerning the layout of objects within the document. More specifically, CPU 11 subjects the bit map document image to block selection techniques such as those described in the above mentioned U.S. application Ser. No. 07/873,012, now U.S. Pat. No. 5,680,479 so as to decompose the document image into a general set of objects. Using rule-based decisions, such block selection techniques are able to identify related regions or areas within the document, and are able to determine the type of images within those regions. For example, using the block selection techniques described in the aforementioned U.S. application Ser. No. 07/873,012, CPU 11 processes the scanned-in bit map image stored in RAM-14 to identify related regions in the image. Then, CPU 11 identifies the type of region, for example, whether a region is a title region, a text region, a paragraph region, a table region, a line art image region such as a graph, a half-tone image region, a color image region, etc.

FIG. 5 illustrates regions identified on a document image in accordance with processing according to the process steps in Step 402. FIG. 5 is a representative document image consisting of page 40 from a magazine article. As shown in FIG. 5, page 40 includes title regions such as regions 41, 42 and 47, as well as text regions such as regions 43, 44 and 48. Likewise, page 40 includes line art image regions 45, table regions 49 and half-tone object regions 46. Other types of regions are possible. In accordance with processing in Step S402, CPU 11 identifies the related regions in the document and determines the type of image in each of the regions. In FIG. 5, each region has been indicated diagrammatically with a circumscribing rectangle.

Reverting to FIG. 4, flow then advances to Step S403 in which CPU 11 identifies the document type. More specifically, many documents have relatively standard structures; for instance, a business letter virtually always includes a corporate letterhead region (which will be identified in Step S402 as a line art image area), a date and an addressee region (which will be identified in Step S402 as separate but adjacent text regions), salutation, body and closing regions (which will be identified as text regions in Step S402), and a signature (which will be identified as a line art image region). CPU 11 stores templates of these standard document types, and in Step S403 compares the structural information derived in Step S402 with those stored templates. If a match is found between the stored template and the structural information derived in Step S402, then CPU 11 assigns the associated document type to the document image stored in RAM 14.

In Step S404, CPU 11 correlates related regions within the document. More specifically, there are often regions within a document that should be considered together, such as the text caption for a figure or the footnote for a text block. For example, referring to FIG. 5, text region 48 is related to title 47, and table region 49 is related to title 50. Using rule-based decision processes, CPU 11 correlates related regions.

In Step S405, CPU 11 subjects designated document regions to OCR processing in preparation for creating a retrieval index for the document. More specifically, so as to be able to retrieve the document image based on a word-based retrieval system, CPU 11 creates a retrieval index from text regions within the document. It is possible to subject all text-type regions, such as title and text regions, which were identified in Step S402 to OCR processing and to form the index based on the resulting text, but more preferably CPU 11 offers the operator a selectable level of indexes. More specifically, CPU 11 offers the operator the option of selecting the index level in accordance with the following levels:

Level 1: Title Regions Only
Level 2: First Line Of Text Regions
Level 3: Text Captions Related To Graphics
Level 4: Full Text If the operator selects Level 1 ("Titles Only"), then CPU 11 subjects only title regions to OCR processing. The resulting text from the title regions is provided for a retrieval index to allow the document to be retrieved when words in the title match a specified search query. Likewise, if the operator specifies Index Level 2 ("First Line of Text Regions"), then CPU 11 subjects both title regions as well as only the first line of each text regions to OCR processing, and creates a retrieval index based on the resulting text. If Index Level 3 is selected ("Text Captions Related To Graphics"), then CPU 11 subjects the items in Levels 1 and 2 to OCR processing as well as text regions related to graphics as specified in the correlations obtained in step S404. Finally, if the operator specifies Index Level 4 ("Full Text"), then both title regions and full text regions wherever located are subjected to OCR processing and the resulting text provided to form the retrieval index. It is possible to include other indexing levels.

In step S406, the ASCII text characters obtained from OCR processing are indexed and the document retrieval index is updated appropriately. In addition to indexing the ASCII text words, a flag is also indexed which indicates the type of object from which the word was obtained, that is, title, text, caption, etc. The flag may be used as part of the retrieval process so as to retrieve documents based on the occurrence of words in particular regions of documents.

In Step S407, CPU 11 stores the structural information that was derived in Step S402 and that was correlated in Step S406. FIG. 6 is a representative view of how the structural information is stored. As shown in FIG. 6, for each document the structural information includes a document identifier 51 which is the same identifier as that assigned to the full document image and by which it is possible to retrieve the full document image. In area 52, the document type derived in Step S402 is stored. At 53, all of the structural information for the document, and its layout within the document, is stored. As shown at 53, for each region identified in Step S402, CPU 11 stores a region identifier, a region type, rectangular coordinates that specify the position of the region on the page (here the upper left corner ("ULC") coordinates and the lower right corner ("LRC") coordinates), and all related regions identified in Step S406. In FIG. 6, region 1 corresponds to region 41 in FIG. 5 and, as shown in FIG. 6, includes a "title"type, upper left hand coordinates of <0,0>, lower right hand coordinates of <5,40>, and no related regions. The remaining regions illustrated in FIG. 6 follow in like fashion.

Region attributes 54 may also be stored, for example, font selection and size as illustrated in FIG. 6. Other attributes may also be stored, such as number of text lines, number of paragraphs, etc.

In Step S408, the document image is stored, preferably with OCR-processed document text. The document text is stored in the event that a quick display of ASCII text characters is desired rather than the slower display of images of text regions. Accordingly, at the end of Step S408, CPU 11 has completed document input processing and has stored a text-searchable index for the document, a full image for the document, the structure of the document, and, if desired, OCR-processed text of text regions of the document.

Reverting to FIG. 3, if an operator selects document retrieval (Step S304), then flow advances to Step S305 for document retrieval processing. Document retrieval processing used in the preferred embodiment of the invention is a word-based retrieval and search system based on an operator-specified search query. Such a query may be specified by a logical sequence that must be found in each document (a "Boolean" search), or may be specified by a natural language based query system. The query may be made directly by a local operator, or remotely by an operator with voice or DTMF phone access, or from commands issued by a remote computer via modem or LAN.

The operator may also specify that documents are retrieved based on the occurrence of words in particular document regions, such as title regions or captions. Documents matching the query are retrieved and are assigned scores based on the degree that the document matches the query. Higher scores may be assigned for occurrences of words in particular regions of documents, the score being scaled the same as the above indexing level selection. Thus, for example, a higher score may be assigned for occurrences of words in title regions than for occurrences of words in text regions. When plural documents are retrieved, they are displayed in order of their score.

Figure 7:
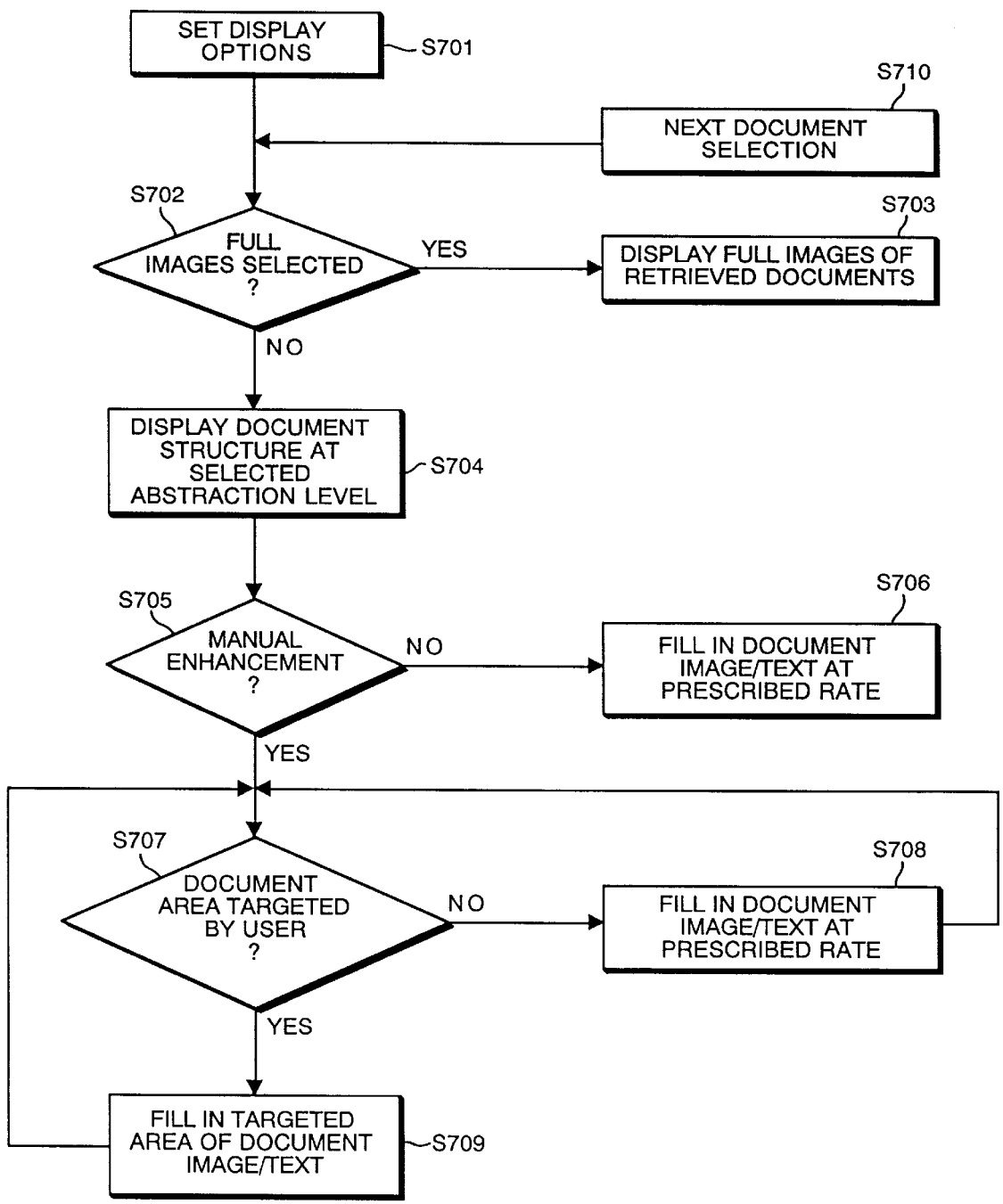
FIG. 7 is a flow diagram for explaining document display according to the invention.

When an operator selects document display processing (Step S306), then flow advances to Step S307 for CPU 11 to execute document display processing. FIG. 7 is a detail flow diagram illustrating document display processing.

In Step S701, CPU 11 allows the operator to set display options by which retrieved documents will be displayed. Specifically, the operator selects one of two modes by which retrieved documents will be displayed: full document image mode or browse mode. If the full document image mode is selected, then full document images of retrieved documents will be displayed. If the browse mode is selected, then only an abstract structural view of each document image is displayed, thereby permitting an operator to browse rapidly through all retrieved documents. In the browse mode, three further parameters may be set by the operator. First, the operator may select whether to display ASCII text characters of OCR-processed text regions or document images of text regions. Second, the operator may select the abstraction level at which the structural view is displayed. Nine abstraction levels are possible in this embodiment of the invention, though other arrangements are possible:

Level 1: Structure Only
Level 2: Titles
Level 3: Retrieval Parameters
Level 4: First Line of Text
Level 5: Full Text
Level 6: Tables
Level 7: Line Art
Level 8: Half-tone
Level 9: Color In accordance with the selected abstraction level, CPU 11 will display structural views of the document mixed with regions of full document images. If abstraction Level 1 is selected, then only structure is displayed. But if abstraction Level 2 or above is selected, then structural information is displayed mixed with regions of full document images. For example, at abstraction Level 2, structural information is displayed mixed with images (or ASCII text, if selected) of title regions of the document. The needed image regions are obtained from the full document image in accordance with the ULC and LRC coordinates stored with the structure. If abstraction Level 3 is selected, then structural information is displayed mixed with images of titles (or ASCII text, if selected) and the retrieval parameters by which the document was retrieved. At abstraction Level 4, structural information is displayed mixed with images of title regions, retrieval parameters, and the first line of text images in each text block. As before, if ASCII text display is selected, then ASCII text is displayed rather than images of text. Higher abstraction levels cumulatively display more and more of the full document image in accordance with the selected abstraction level.

In addition to the abstraction level parameter, in the browse mode the operator can also select whether to allow image enhancement manually or automatically. Specifically, in manual image enhancement, when the structure of a retrieved document is displayed, the operator may target a particular region of the document, for example with mouse 19, and request for CPU 11 to replace the displayed region with the full document image. If automatic enhancement is selected, then CPU 11 automatically replaces the structural information that it is displaying with full document images. Automatic enhancement operates during quiescent periods of CPU operation, that is, when the CPU has sufficient processing time so as to enhance the image. Enhancement progresses in the order of the abstraction levels given above. Thus, during quiescent processing periods, CPU begins to replace, first, title regions with full images of the title regions, second, retrieval parameter regions with full images of the retrieval parameters, third, the first lines of the text regions with full images of the first lines of text, etc.

After display options have been set in Step S701, flow advances to Step S702 in which CPU 11 determines whether the full image mode has been selected. If the full image mode has been selected, then flow branches to Step S703 in which full images are displayed.

Figure 8:
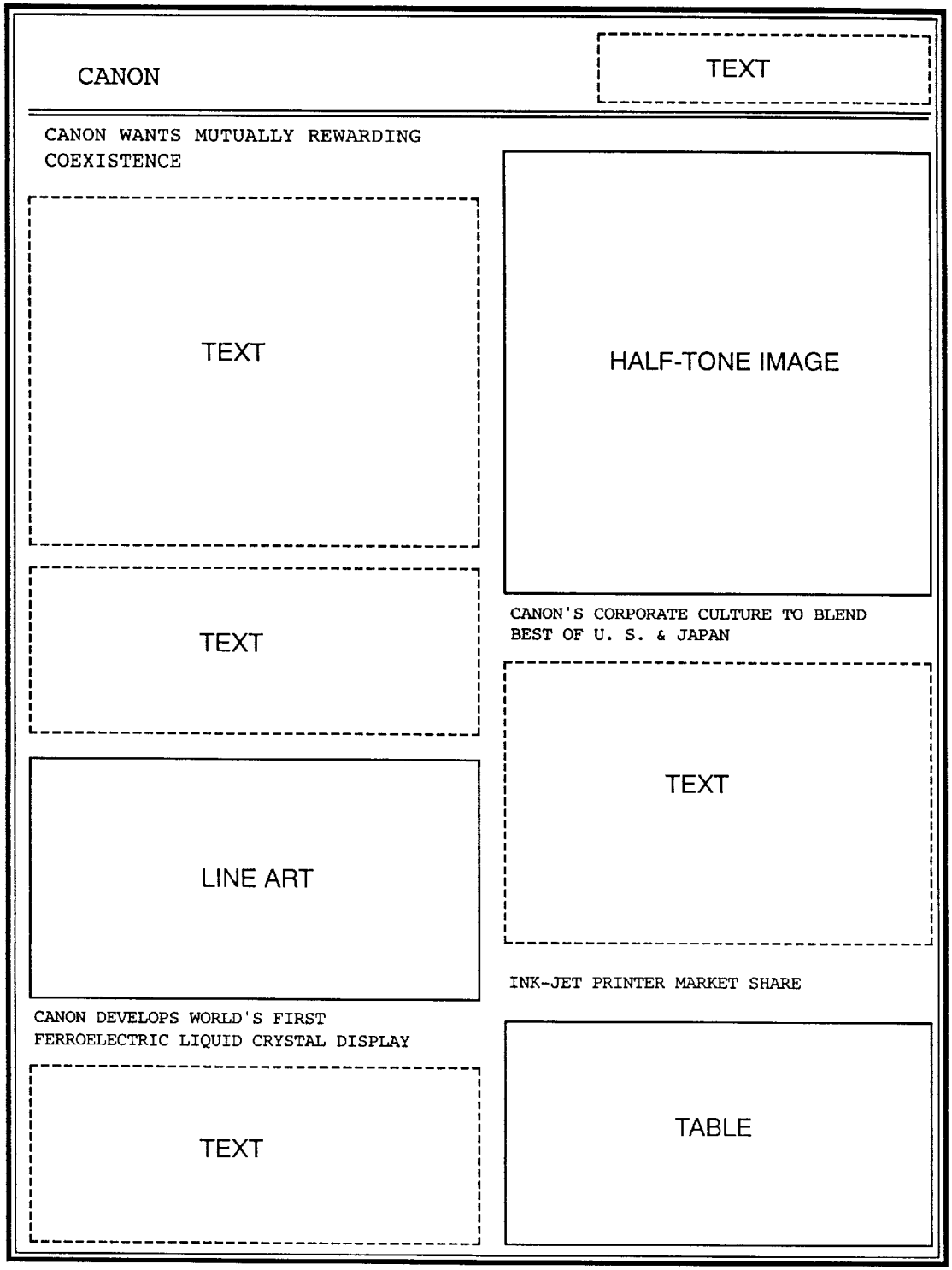

On the other hand, if the browse mode has been selected, then flow advances to Step S704 in which the structure of the document is displayed at the selected abstraction level. A representative display of structural information is shown in FIG. 8. In FIG. 8, the operator has selected the browse mode, and has selected ASCII text display at abstraction Level 2, that is "Titles". Thus, as shown in FIG. 8, an abstracted structural view of the document is presented to the operator, with ASCII text equivalents of title regions. The remaining regions are simply labeled with the region type, as specified in the region type area of FIG. 6. Labelling may be by color coding of the region, or, as shown in FIG. 8, by applying a text label. Each of the regions is circumscribed by a rectangular shape whose coordinates are specified by the "ULC" and "LRC" coordinates of FIG. 6. ASCII text equivalents of title regions are displayed at the corresponding ULC and LRC coordinates. Thus, the operator is presented with an abstract structural view of the document with a selectable abstraction level. This permits the operator to browse quickly through retrieved documents so as to find particular documents of interest.

Flow then advances to step S705 in which CPU 11 determines if the manual enhancement parameter has been selected. If the manual enhancement parameter has not been selected, then flow branches to step S706 in which CPU 11 automatically replaces structurally displayed regions of the document with full images (or ASCII text, if selected) of those regions during quiescent operating times of the CPU. Thus, assuming that sufficient quiescent operating time is available, if the automatic enhancement mode has been selected, then the full document will eventually be presented to the operator as the CPU replaces the structurally represented regions of that document. At any time during this process the operator may select for the next retrieved document to be displayed (Step S710) whereupon flow returns to Step S702 so as to display the next retrieved document.

If the manual enhancement mode has been selected, then flow advances to Step S707 in which CPU 11 determines whether a document region has been targeted by the operator. If no document region has been targeted by the operator, then CPU 11 does nothing, or more preferably, begins to replace structural regions of the document with full document images as shown at Step S708. Again, this process may be interrupted at any time by operator selection of the next document (Step S710).

Figure 9:
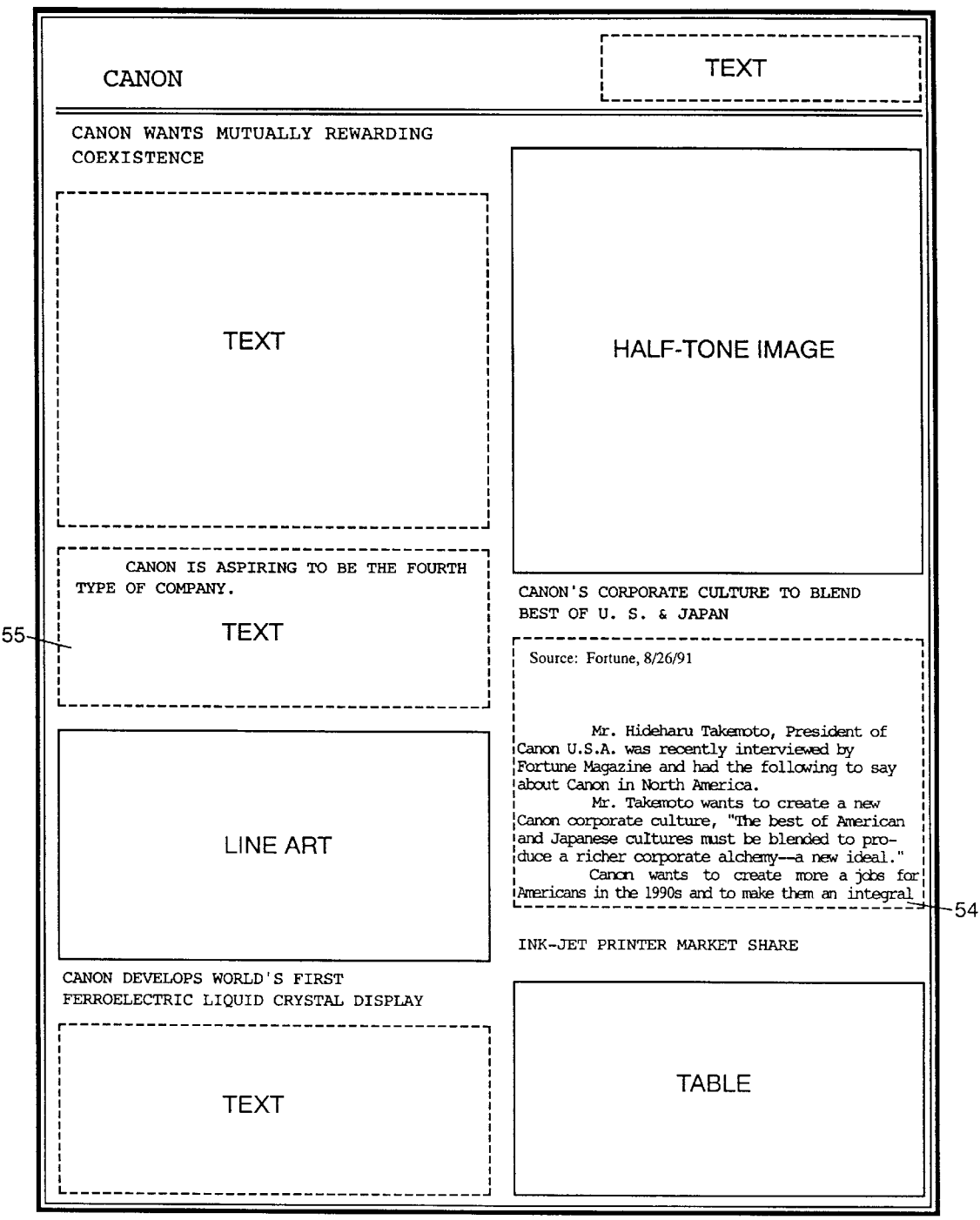

On the other hand, if in Step S707 the operator targets a document region for replacement, then flow advances to Step S709 in which CPU 11 retrieves the corresponding document image form the document image file and replaces the structurally represented region of the displayed document with the full document image. Thus, as shown in FIG. 9, the operator has targeted area 54 which is a text region. CPU 11 thereupon retrieves the document image corresponding to the rectangular area circumscribed by the ULC and LRC coordinates, or the ASCII text equivalent if that option has been selected, and replaces the area in FIG. 8 with the corresponding document image as shown in FIG. 9. Flow then returns to Step S707 to await further designations by the operator.

In FIG. 9, the ASCII text equivalent for region 54 does not fit into the allotted area. In this situation, CPU 11 only displays the amount of text that will fit, but, so as to allow the operator to view all the text, CPU 11 permits scrolling within the area.

As further shown in FIG. 9, the operator has requested for the first line of text from region 44 to be displayed, and the ASCII text equivalent of that text is displayed at 55. Of course, if image mode was selected, then the image of the first line of text would have been displayed.

In Step S709, if an operator targets a document region which has a related region, such as region 42 or 43, then not only does CPU 11 replace the targeted region, but CPU 11 also replaces the related region as well. Accordingly, if the operator targets region 42, which is a title region, CPU 11 replaces title region 42 with the full image (or text) of region 42, and also replaces text region 43 with the full image (or text) of text region 43. By virtue of this feature, the operator is provided with quick access to information that is desired without requiring the operator to execute additional keystrokes, etc.

Figure 10:
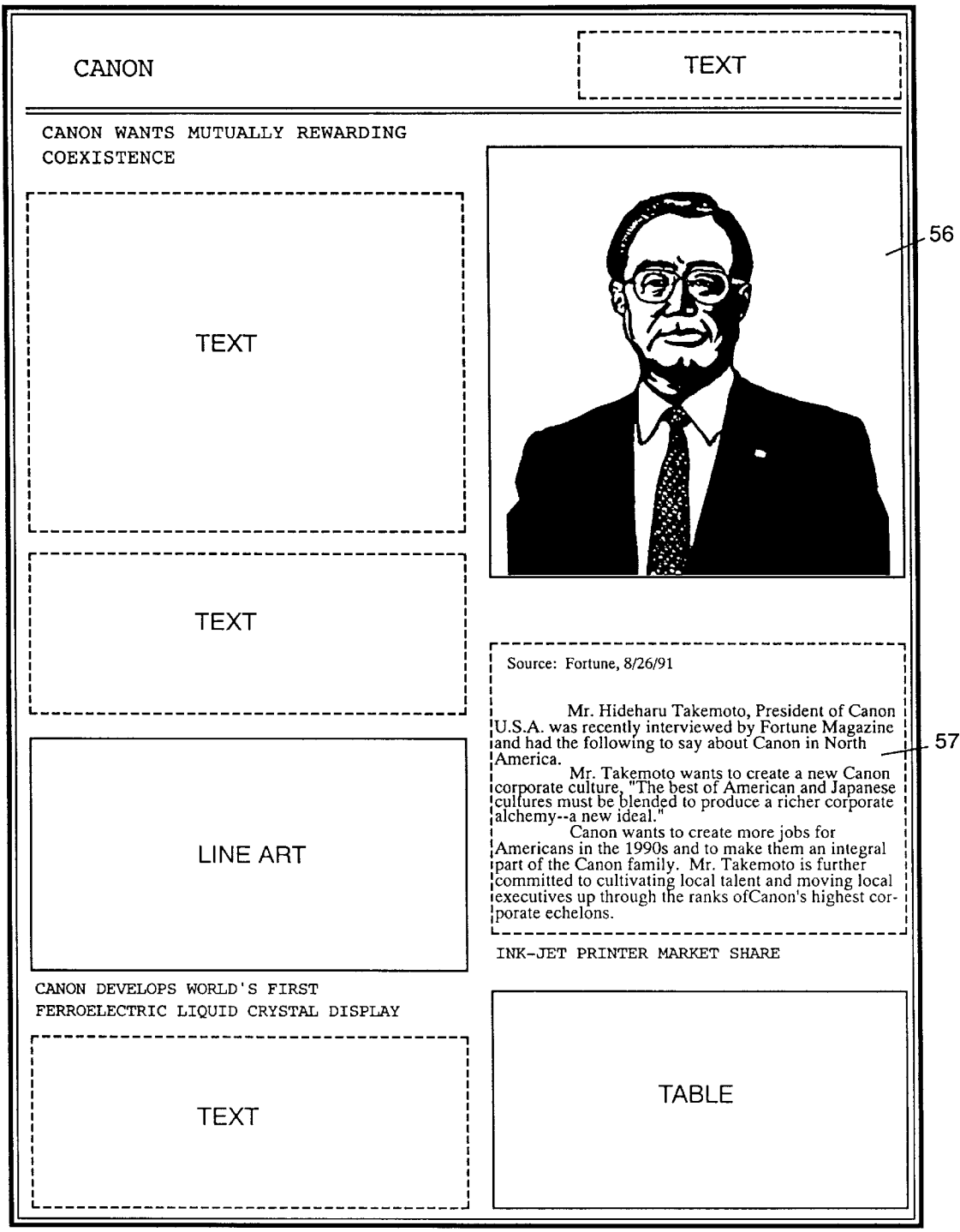

FIG. 10 shows a situation in which the operator has selected for certain regions to be displayed as images rather than as ASCII text. More particularly, the operator has requested for full images of regions 46 and 48, and those regions have been provided as shown at 56 and 57, respectively.

What is claimed is:

1. A method for creating a retrieval index by which an image of an arbitrarily formatted document may be retrieved, the method comprising the steps of:

processing the image of the arbitrarily formatted document to identify text regions on the document and non-text regions on the document, said processing step including, for each text region on the document, the step of automatically determining a region type using rule-based decisions automatically applied to the image of the text region without regard to a position of the text region in the document and without regard to a predetermined format for the document, the region type being one of plural different predefined region types encompassed by the rules;

converting the image of the document in text regions into text;

indexing the converted text so as to permit retrieval by reference to the converted text;

indexing the automatically determined region types so as to permit retrieval by reference to one of the determined region types; and storing the image of the document such that the stored document image may be retrieved by reference to whether text in a text query appears in the indexed text and by reference to whether the text in the text query appears in one of the indexed region types.

2. A method according to claim 1, further comprising the step of determining a region type for both text regions and non-text regions on the document.

3. A method according to claim 2, further comprising the steps of retrieving a document and displaying an abstracted view of the document in which regions of the document are identified in accordance with the corresponding region types.

4. A method according to claim 3, further comprising the step of progressive replacement of regions within the abstracted view of the document with corresponding full images of the regions of the document.

5. A method according to claim 4, wherein progressive replacement is automatic and proceeds in an order determined by priority among the plural different predefined region types.

6. A method according to claim 4, wherein progressive replacement is manual in accordance with operator designation.

7. A method according to claim 3, wherein said step of retrieving assigns a score to each retrieved document in accordance with the degree of match to retrieval parameters and wherein the retrieved documents are displayed in an order determined by the score.

8. A method according to claim 3, wherein said step of retrieving includes retrieval over modem or local area network (LAN).

9. A method according to claim 8, further comprising the step of retrieving images of regions for the document over the modem or LAN when sufficient time is available, and the step of progressive replacement of regions within the abstracted view of the document with the retrieved images of the regions of the document.

10. A method according to claim 9, wherein progressive replacement is automatic and proceeds in an order determined by priority among the plural different predefined region types.

11. A method according to claim 9, wherein progressive replacement is manual in accordance with operator designation.

12. A method according to claim 2, wherein the region type for non-text regions is selected from a group of predefined region types which includes line art regions, halftone regions, and table regions.

13. A method according to claim 1, further comprising the step of designating an index level which specifies which region types should be indexed, and wherein said converting step converts text regions in accordance with the designated index level.

14. A method according to claim 1, wherein the region types for text regions are selected from a group of predefined region types which include title regions and main text regions.

15. A method according to claim 1, wherein said processing step comprises block selection processing of the image to decompose the image into a set of objects and to use rule-based decisions to identify text and non-text regions on the document.

16. A method according to claim 15, wherein the block selection processing uses rule-based decisions to identify related regions on the document.

17. A method according to claim 1, wherein the region type is automatically determined without user intervention.

18. A method according to claim 17, wherein the arbitrarily formatted document is of a format previously unknown to the rule-based decisions.

19. Apparatus for creating a retrieval index by which an image of an arbitrarily formatted document may be retrieved, said apparatus comprising:

a scanner for scanning an original arbitrarily formatted document and for outputting a bit map document image corresponding to the original arbitrarily formatted document;

a first memory region for storing a document image and a retrieval index;

a second memory region for storing process steps; and a processor for executing the process steps stored in said second memory region;

wherein said second memory region includes process steps to (a) receive the bit map document image scanned by said scanner, (b) process the bit map document image to identify text regions in the document and non-text regions in the document, said processing step including, for each text region on the document, the step of automatically determining a region type using rule-based decisions automatically applied to the image of the text region without regard to a position of the text region in the document and without regard to a predetermined format for the document, the region type being one of plural different predefined region types encompassed by the rules, (c) convert the document image in text regions into text, (d) index the converted text so as to permit retrieval by reference to the converted text, (e) index the automatically determined region types so as to permit retrieval by reference to one of the predetermined region types, and (f) store the document image in said first memory region such that the stored document image may be retrieved by reference to whether text in a text query appears in the indexed text and by reference to whether the text in the text query appears in one of the indexed region types.

20. Apparatus according to claim 19, wherein said second memory region includes process steps to determine a region type for both text regions and non-text regions in the bit map document.

21. Apparatus according to claim 20, further comprising a display interface, and wherein said second memory region includes process steps to retrieve a document and to transmit an abstracted view of retrieved documents to said display interface in which regions of the document are identified in accordance with corresponding region types.

22. Apparatus according to claim 21, wherein said second memory region includes process steps to progressively replace regions within the abstracted view of retrieved documents with corresponding regions from the document image.

23. Apparatus according to claim 22, wherein progressive replacement is automatic and proceeds in an order determined by priority among the plural different predefined region types.

24. Apparatus according to claim 22, further including a designation means, and wherein replacement is manual in accordance with designation by said designation means.

25. Apparatus according to claim 21, wherein retrieved documents are assigned a score in accordance with the degree of match to retrieval parameters, and wherein the retrieved documents are displayed in an order determined by the score.

26. Apparatus according to claim 21, further comprising data transmission means comprised by a modem or a local area network (LAN), wherein documents are retrieved over said data transmission means.

27. Apparatus according to claim 26, further comprising retrieving means for retrieving images of regions for the document over the modem or LAN when sufficient time is available, and replacement means for progressively replacing regions within the abstracted view of the document with the retrieved images of the regions of the document.

28. Apparatus according to claim 27, wherein progressive replacement is automatic and proceeds in an order determined by priority among the plural different predefined region types.

29. Apparatus according to claim 27, further including designation means, and wherein replacement is manual in accordance with designation by said designation means.

30. Apparatus according to claim 20, wherein the region type for non-text regions is selected from a group of predefined region types which includes line art regions, half-tone regions, and table regions.

31. Apparatus according to claim 19, wherein said process steps include steps to designate an index level which specifies which region types should be indexed, and wherein said process step to convert converts text regions in accordance with the designated index level.

32. Apparatus according to claim 19, wherein the region types for text regions are selected from a group of predefined region types which include title regions and main text regions.

33. A method according to claim 19, wherein the step to process the bit map document image comprises block selection processing of the image to decompose the image into a set of objects and to use rule-based decisions to identify text and non-text regions on the document.

34. A method according to claim 33, wherein the block selection processing uses rule-based decisions to identify related regions on the document.

35. An apparatus according to claim 19, wherein the region type is automatically determined without user intervention.

36. An apparatus according to claim 35, wherein the arbitrarily formatted document is of a format previously unknown to the rule-based decisions.

37. A method for displaying documents comprising the steps of:
provising an image of a document and corresponding composition information for the document, the composition information including region type information for each of up to plural regions of the document;
displaying an abstracted view of the document using the composition information;
replacing, within the abstracted view itself, at least one region of the abstracted view with a corresponding image of the document, so that composition information and image information are mixedly displayed.

38. A method according to claim 37, further comprising the step of designating an abstraction level based on the composition information for displaying the abstracted view of the document, and wherein in said displaying step the abstracted view is displayed with mixed regions of composition information and document image in accordance with the designated abstraction level.

39. A method according to claim 37, wherein in said providing step a plurality of document images and corresponding document composition information are provided, and further comprising the step of retrieving one of the plurality of document images and corresponding document composition information for display.

40. A method according to claim 39, wherein the retrieved documents are assigned a score in accordance with the degree of match to retrieval parameters, and wherein the retrieved documents are displayed in an order determined by the score.

41. A method according to claim 39, wherein in said displaying step, the abstracted view is displayed mixed with retrieval parameters.

42. A method according to claim 37, further comprising the step of labelling regions of the abstracted view in accordance with the composition information for the regions.

43. A method according to claim 37, wherein said displaying step is a verbal enunciation of document structure through text-to-speech conversion of the composition information.

44. A method according to claim 37, further comprising the step of identifying document type based on the composition information.

45. A method according to claim 37, further comprising the step of identifying related regions in the document, and wherein in said replacing step, when a region within the abstracted view is replaced, related regions within the abstracted view are also replaced.

46. A method according to claim 37, wherein in said replacing step, text regions on the document are replaced with text images of the document or with text equivalents in accordance with manual selection.

47. A method according to claim 37, wherein in said providing step, the image of the document is provided from a remote source over a modem or a local area network (LAN).

48. A method according to claim 47, wherein in said providing step, images for regions of the document are retrieved over the modem or LAN when sufficient time is available, and wherein said replacing step is progressive such that regions on the abstracted view are progressively replaced within the abstracted view with the retrieved images of regions of the document.

49. A method according to claim 48, wherein progressive replacement is automatic and proceeds in an order determined by priority among the plural different predefined region types.

50. A method according to claim 48, wherein progressive replacement is manual in accordance with operator designation.

51. Apparatus for displaying a document comprising:
means for providing an image of a document and corresponding composition information for the document, the composition information including region type information for each of up to plural regions of the document;
means for displaying an abstracted view of the document using the composition information; and
means for replacing, within the abstracted view itself, at least one region of the abstracted view with a corresponding image of the document, so that composition information and image information are mixedly displayed.

52. An apparatus according to claim 51, further comprising designating means for designating an abstraction level based on the composition information for displaying the abstracted view of the document, wherein said abstracted view is displayed with mixed regions of composition information and document image in accordance with the designated abstraction level.

53. An apparatus according to claim 51, wherein a plurality of document images and corresponding document composition information are provided, and further comprising retrieving means for retrieving one of the plurality of document images and corresponding document composition information for display.

54. An apparatus according to claim 53, wherein the retrieved documents are assigned a score in accordance with the degree of match to retrieval parameters, and wherein the retrieved documents are displayed in an order determined by the score.

55. An apparatus according to claim 53, wherein said displaying means displays the abstracted view mixed with retrieval parameters.

56. An apparatus according to claim 51, further comprising labelling means for labelling regions of the abstracted view in accordance with the composition information for the regions.

57. An apparatus according to claim 51, wherein said displaying means is a verbal enunciation of document structure through text-to-speech conversion of the composition information.

58. An apparatus according to claim 51, further comprising identifying means for identifying document type based on the composition information.

59. An apparatus according to claim 51, further comprising identifying means for identifying related regions within the document, and wherein when said replacing means replaces a region in the abstracted view, related regions within the abstracted view are also replaced.

60. An apparatus according to claim 51, wherein the regions on the document are replaced with text images of the document or with text equivalents in accordance with a manual selection.

61. Apparatus according to claim 51, wherein the image of the document is provided from a remote source over a modem or a local area network (LAN).

62. Apparatus according to claim 61, wherein images for regions of the document are retrieved over the modem or LAN when sufficient time is available, and wherein replacement of regions of the abstracted view is progressive such that regions of the abstracted view are progressively replaced within the abstracted view with the retrieved images of regions of the document.

63. A method according to claim 62, wherein progressive replacement is automatic and proceeds in an order determined by priority among the plural different predefined region types.

64. Apparatus according to claim 62, wherein progressive replacement is manual in accordance with operator designation.

65. A document display apparatus comprising:

a display;

a first memory region from which an image of a document and corresponding composition information for the document may be retrieved;

a second memory region for storing process steps;

a processor for executing the process steps stored in said second memory region;

wherein said second memory region includes process steps to (a) display on said display an abstracted view of a retrieved document in accordance with the composition information, and (b) replace, within the abstracted view itself, a selected region of the abstracted view with a corresponding document image, so that composition information and image information are mixedly displayed.

66. Apparatus according to claim 65, further comprising input means for inputting operator designations, and wherein said second memory region includes process steps to permit designation of an abstraction level at which the abstracted view is displayed, wherein mixed regions of composition information and document image are displayed in accordance with the designated abstraction level.

67. Apparatus according to claim 65, wherein said first memory region includes plural document images and plural corresponding composition information, and wherein said second memory region includes process steps to retrieve one of the plurality of stored document images and corresponding document composition information for display.

68. An apparatus according to claim 67, wherein the retrieved documents are assigned a score in accordance with the degree of match to retrieval parameters, and wherein the retrieved documents are displayed in an order determined by the score.

69. Apparatus according to claim 67, wherein the abstracted view is displayed mixed with retrieval parameters.

70. Apparatus according to claim 65, wherein said processor labels the displayed abstracted view in accordance with the composition information stored in said first memory region.

71. Apparatus according to claim 65, wherein said processor enunciates the document composition information in accordance with text-to-speech conversion of the composition information.

72. Apparatus according to claim 65, wherein said processor identifies document type based on the stored composition information.

73. Apparatus according to claim 65, wherein the stored composition information correlates related regions within the document, and wherein when said processor replaces a region of the abstracted view with corresponding regions of document image, said processor also replaces related regions within the abstracted view.

74. An apparatus according to claim 65, wherein text regions on the document are replaced with text images of the document or with text equivalents in accordance with a manual selection.

75. Apparatus according to claim 65, wherein said first memory region is accessed remotely over a modem or a local area network (LAN).

76. Apparatus according to claim 75, wherein images for regions of the document are retrieved over the modem or LAN when sufficient time is available, and wherein replacement of regions of the abstracted view is progressive such that regions of the abstracted view are progressively replaced within the abstracted view with the retrieved images of regions of the document.

77. A method according to claim 76, wherein progressive replacement is automatic and proceeds in an order determined by priority among the plural different predefined region types.

78. Apparatus according to claim 76, wherein progressive replacement is manual in accordance with operator designation.

79. A method for creating a retrieval index by which an image of an arbitrarily formatted document may be retrieved, the method comprising the steps of:

processing the image of the arbitrarily formatted document to identify text regions on the document and non-text regions on the document, said processing step including, for each text region on the document, the step of automatically determining a region type using rule-based decisions automatically applied to the image of the text region without regard to a position of the text region in the document and without regard to a predetermined format for the document, the region type being one of plural different predefined region types encompassed by the rules;

converting the image of the document in text regions into text;

indexing the converted text so as to permit retrieval by reference to the converted text;

indexing the automatically determined region types so as to permit retrieval by reference to one of the determined region types; and associating the image of the document with the indexed text such that the image of the document may be retrieved by reference to whether text in a text query appears in the indexed text and by reference to whether the text in the text query appears in one of the indexed region types.

80. A method according to claim 79, further comprising the step of determining a region type for both text regions and non-text regions on the document.

81. A method according to claim 80, further comprising of the steps of retrieving a document and displaying an abstracted view of the document in which regions of the document are identified in accordance with the corresponding region types.

82. A method according to claim 81, further comprising the step of progressive replacement of regions within the abstracted view of the document with corresponding full images of the regions of the document.

83. A method according to claim 82, wherein progressive replacement is automatic and proceeds in an order determined by priority among the plural different predefined region types.

84. A method according to claim 82, wherein progressive replacement is manual in accordance with operator designation.

85. A method according to claim 81, wherein said step of retrieving assigns a score to each retrieved document in accordance with the degree of match to retrieval parameters and wherein the retrieved documents are displayed in an order determined by the score.

86. A method according to claim 81, wherein said step of retrieving includes retrieval over modem or local area network (LAN).

87. A method according to claim 86, further comprising the step of retrieving images of regions for the document over the modem or LAN when sufficient time is available, and the step of progressive replacement of regions within the abstracted view of the document with the retrieved images of the regions of the document.

88. A method according to claims 87, wherein progressive replacement is automatic and proceeds in an order determined by priority among the plural different predefined region types.

89. A method according to claim 87, wherein progressive replacement is manual in accordance with operator designation.

90. A method according to claim 80, wherein the region type for non-text regions is selected from a group of predefined region types which includes line art regions, halftone regions, and table regions.

91. A method according to claim 79, further comprising the step of designating an index level which specifies which region types should be indexed, and wherein said converting step converts text regions in accordance with the designated index level.

92. A method according to claim 79, wherein the region types for text regions are selected from a group of predefined region types which include title regions and main text regions.

93. A method according to claim 79, wherein said processing step comprises block selection processing of the image to decompose the image into a set of objects and to use rule-based decisions to identify text and non-text regions on the document.

94. A method according to claim 93, wherein the block selection processing uses rule-based decisions to identify related regions on the document.

95. A method according to claim 79, wherein the region type is automatically determined without user intervention.

96. A method according to claim 95, wherein the arbitrarily formatted document is of a format previously unknown to the rule-based decisions.

97. Apparatus for creating a retrieval index by which an image of an arbitrarily formatted document may be retrieved, said apparatus comprising:

a scanner for scanning an arbitrarily formatted original document and for outputting a bit map document image corresponding to the original arbitrarily formatted document;

a first memory region for storing a document image and a retrieval index;

a second memory region for storing process steps; and a processor for executing the process steps stored in said second memory region;

wherein said second memory region includes process steps to (a) receive the bit map document image scanned by said scanner, (b) process the bit map document image to identify text regions in the document and non-text regions in the document, said processing step including, for each text region on the document, the step of automatically determining a region type using rule-based decisions applied to the image of the text region without regard to a position of the text region in the document and without regard to a predetermined format for the document, the region type being one of plural different predefined region types encompassed by the rules, (c) convert the document image in text regions into text, (d) index the converted text so as to permit retrieval by reference to the converted text, (e) index the automatically determined region types so as to permit retrieval by reference to one of the region types, and (f) associate the document image with the indexed text such that the document image may be retrieved by reference to whether text in a text query appears in the indexed text and by reference to whether the text in the text query appears in one of the indexed region types.

98. Apparatus according to claim 97, wherein said second memory region includes process steps to determine a region type for both text regions and non-text regions in the bit map document.

99. Apparatus according to claim 98, further comprising a display interface, and wherein said second memory region includes process steps to retrieve a document and to transmit an abstracted view of retrieved documents to said display interface in which regions of the document are identified in accordance with corresponding region types.

100. Apparatus according to claim 99, wherein said second memory region includes process steps to progressively replace the abstracted regions within the abstracted view of retrieved documents with corresponding regions from the full document image.

101. Apparatus according to claim 100, wherein progressive replacement is automatic and proceeds in an order determined by priority among the plural different predefined types.

102. Apparatus according to claim 100, further including a designation means, and wherein replacement is manual in accordance with designation by said designation means.

103. Apparatus according to claim 99, wherein retrieved documents are assigned a score in accordance with the degree of match to retrieval parameters, and wherein the retrieved documents are displayed in an order determined by the score.

104. Apparatus according to claim 99, further comprising data transmission means comprised by a modem or a local area network (LAN), wherein documents are retrieved over said data transmission means.

105. Apparatus according to claim 104, wherein images of regions for the document are retrieved over the modem or LAN when sufficient time is available, and wherein regions within the abstracted view of the document are progressively replaced with the retrieved images of the regions of the document.

106. Apparatus according to claim 105, wherein progressive replacement is automatic and proceeds in an order determined by priority among the plural different predefined region types.

107. Apparatus according to claim 105, further including designation means, and wherein replacement is manual in accordance with designation by said designation means.

108. Apparatus according to claim 98, wherein the region type for non-text regions is selected from a group of predefined region types which includes line art regions, halftone regions, and table regions.

109. Apparatus according to claim 97, wherein said process steps include steps to designate an index level which specifies which region types should be indexed, and wherein said process step to convert converts text regions in accordance with the designated index level.

110. Apparatus according to claim 97, wherein the region types for text regions are selected from a group of predefined region types which include title regions and main text regions.

111. A method according to claim 97, wherein the step to process the bit map document image comprises block selection processing of the image to decompose the image into a set of objects and to use rule-based decisions to identify text and non-text regions on the document.

112. A method according to claim 111, wherein the block selection processing uses rule-based decisions to identify related regions on the document.

113. An apparatus according to claim 97, wherein the region type is automatically determined without user intervention.

114. An apparatus according to claim 113, wherein the arbitrarily formatted document is of a format previously unknown to the rule-based decisions.

115. A computer-readable memory medium storing computer-executable process steps to create a retrieval index by which an image of an arbitrarily formatted document may be retrieved, comprising:

a processing step to process the image of the arbitrarily formatted document to identify text regions on the document and non-text regions on the document, said processing step including, for each text region on the document, a step to determine a region type using rule-based decisions automatically applied to the image of the text region without regard to a position of the text region in the document and without regard to a predetermined format for the document, the region type being one of plural different predefined region types encompassed by the rules;

a converting step to convert the image of the document in text regions into text;

a text indexing step to index the converted text so as to permit retrieval by reference to the converted text;

a region type indexing step to index the automatically determined region types so as to permit retrieval by reference to one of the determined region types; and a storing step to store the image of the document such that the stored document image may be retrieved by reference to whether text in a text query appears in the indexed text and by reference to whether the text in the text query appears in one of the indexed region types.

116. A computer-readable memory medium according to claim 115, wherein the region type is automatically determined without user intervention.

117. A computer-readable memory medium according to claim 116, wherein the arbitrarily formatted document is of a format previously unknown to the rule-based decisions.

118. A computer-readable memory medium storing computer-executable process steps to display documents comprising:

a providing step to provide an image of a document and corresponding composition information for the document, the composition information including region type information for each of up to plural regions of the document;

a displaying step to display an abstracted view of the document using the composition information;

a replacing step to replace, within the abstracted view itself, at least one region of the abstracted view with a corresponding image of the document, so that composition information and image information are mixedly displayed.

* * * * *